No. 753,168. Patented February 23, 1904.

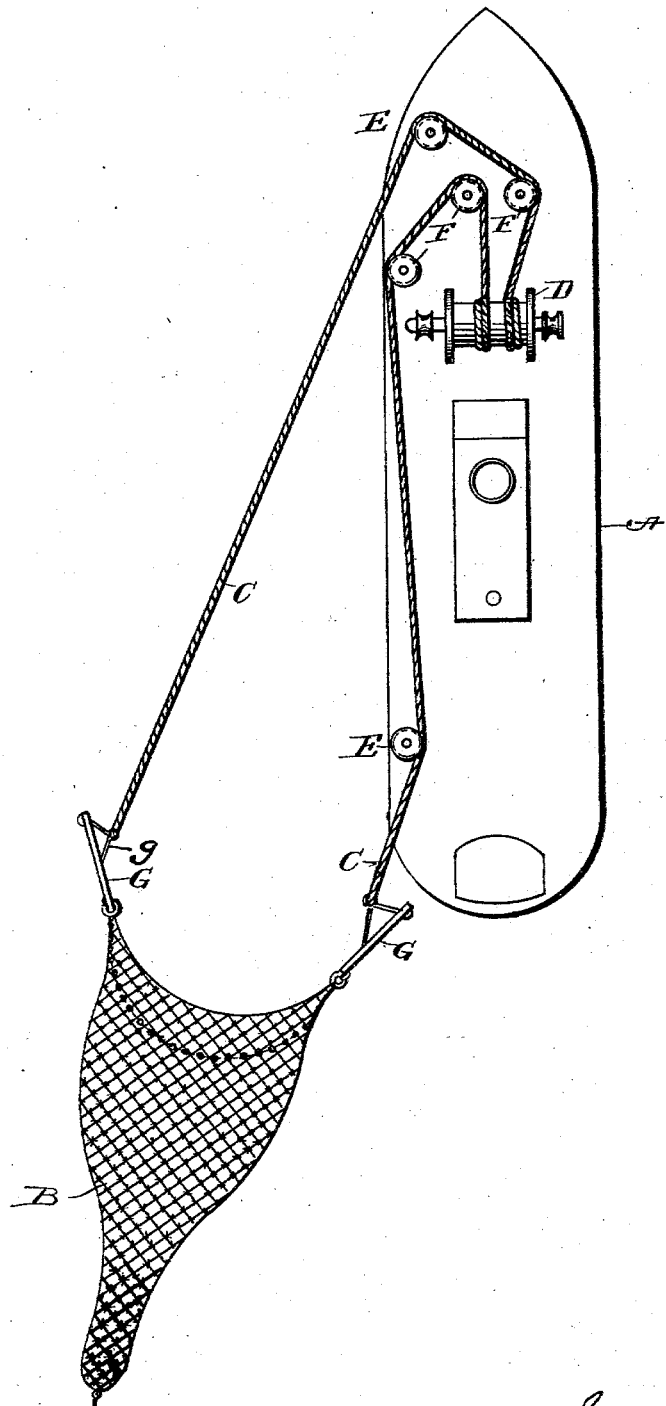

UNITED STATES PATENT OFFICE.

JAMES ROBERT SCOTT, OF HULL, ENGLAND, ASSIGNOR OF THREE-FOURTHS TO WILLIAM MARSHALL, HENRY RIPPON, AND WILLIAM P. SMYTH.

HAULING-GEAR FOR TRAWL-NETS.

SPECIFICATION forming part of Letters Patent No. 753,168, dated February 23, 1904.

Application filed September 10, 1903. Serial No. 172,701. (No model.)

*To all whom it may concern:*

Be it known that I, JAMES ROBERT SCOTT, a citizen of Great Britain, residing at Hull, in the county of York, England, have invented new and useful Improvements in Hauling-Gear for Trawl-Nets, of which the following is a specification.

My invention relates to hauling-gear for trawl-nets, and has for its object an increase in the efficiency of such nets, the particular object of the invention being to prevent the nets from becoming entangled and to always keep them open.

The invention consists in the details of construction hereinafter described and claimed.

Referring to the drawing, A represents a vessel of any suitable kind, and B a trawl-net having at opposite sides of its mouth angularly-shaped boards or spreaders G.

C represents two warps or ropes that are connected at one end to brackets $g$, rigidly secured to the boards or spreaders, and are at their opposite ends wound upon a winch or windlass D, by means of which the net may be readily manipulated.

E E are guide-blocks respectively situated at the bow and the stern of the vessel. The outermost warp or rope passes around the outside of the guide-block at the bow, while the other one passes inside of the guide-block at the stern of the vessel. This arrangement spaces the warps or ropes to such a degree as to prevent them from pulling upon converging lines, and thus tending to close the mouth of the net. It will be understood that the boards or spreaders act upon the water in such a way when the vessel is in motion as to keep the mouth of the net distended, this action being of course due to the rudder-like action of the boards or spreaders. The warps or ropes pass also around fair-leads or guides F, which are disposed forward of the winch or windlass.

The operation of the device will be readily understood from the foregoing description of its construction, the spaced warps or ropes having no tendency to draw the sides of the net together and the boards or spreaders acting to hold the mouth of the net open to the fullest extent.

Having now described my invention, what I claim as new, and desire to secure by Letters Patent, is—

1. The combination of a vessel, a trawl-net provided with means for normally holding its mouth distended, guide-blocks respectively situated at the bow and the stern of the vessel, warps or ropes connected with the net and each passing around one of the guide-blocks and a winch or windlass upon which the warps or ropes may be wound, said guide-blocks being adapted to maintain the separation of the warps or ropes, substantially as described.

2. The combination of a vessel, a trawl-net provided with boards or spreaders for normally holding its mouth distended, guide-blocks respectively situated at the bow and the stern of the vessel, warps or ropes connected with the net and each passing around one of the guide-blocks and a winch or windlass upon which the warps or ropes may be wound, said guide-blocks being adapted to maintain the separation of the warps or ropes, substantially as described.

3. A gearing for trawl-nets including means for maintaining the separation of the warps or ropes, in combination with a trawl-net provided with means for holding its mouth distended, when in use, substantially as described.

In testimony whereof I have signed my name to this specification in the presence of two subscribing witnesses.

JAMES ROBERT SCOTT.

Witnesses:
E. C. HALLER,
RICHARD OBEE.